United States Patent
Allgood et al.

(10) Patent No.: US 6,424,492 B1
(45) Date of Patent: *Jul. 23, 2002

(54) FREQUENCY BASED CARTRIDGE DETECTION SYSTEM

(75) Inventors: Robert D. Allgood, Riverdale; Paul Smith, Salt Lake City; Fred C. Thomas, III, Ogden, all of UT (US)

(73) Assignee: Iomega Corporation, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,534

(22) Filed: Apr. 24, 2000

(51) Int. Cl.$^7$ ............................................... G11B 19/02
(52) U.S. Cl. ...................... 360/133; 360/69; 369/291
(58) Field of Search ........................... 360/69, 133, 60, 360/99.9, 99.02, 132, 73.03; 369/291, 70

(56) References Cited

U.S. PATENT DOCUMENTS

| | | | | |
|---|---|---|---|---|
| 5,638,228 A | * | 6/1997 | Thomas, III | 360/60 |
| 5,986,838 A | * | 11/1999 | Thomas, III | 360/60 |
| 6,008,964 A | * | 12/1999 | Goodknight et al. | 360/92 |
| 6,067,214 A | * | 5/2000 | Thomas, III | 360/133 |
| 6,091,563 A | * | 7/2000 | Thomas, III | 360/69 |
| 6,097,562 A | * | 8/2000 | Thomas, III | 360/60 |
| 6,134,067 A | * | 10/2000 | Nakajima et al. | 360/69 |
| 6,181,662 B1 | * | 1/2001 | Krieger et al. | 369/70 |
| 6,201,662 B1 | * | 3/2001 | Graves et al. | 360/133 |
| 6,212,026 B1 | * | 4/2001 | Ohmi et al. | 360/60 |
| 6,264,107 B1 | * | 7/2001 | Thomas, III et al. | 235/468 |
| 6,266,211 B1 | * | 7/2001 | Thomas, III et al. | 360/133 |
| 6,282,060 B1 | * | 8/2001 | Thomas, III | 360/133 |
| 6,292,319 B1 | * | 9/2001 | Thomas, III | 360/60 |
| 6,297,923 B1 | * | 10/2001 | Burnside et al. | 360/69 |
| 6,297,924 B1 | * | 10/2001 | Thomas, III et al. | 360/69 |
| 6,301,070 B1 | * | 10/2001 | Sakaguchi | 360/73.03 |

* cited by examiner

Primary Examiner—David Hudspeth
Assistant Examiner—Fred F. Tzeng
(74) Attorney, Agent, or Firm—Woodcock Washburn LLP (57) ABSTRACT

A data storage disk having a latent illuminance discrimination marker for determining whether the data storage disk is suitable for use in a disk drive. A light source illuminates the marker and the marker emits illuminance, preferably as phosphorescence. A detector detects the emitted illuminance, and a predetermined characteristic of the marker in the frequency domain is determined. The frequency domain response may be either a phase response or an amplitude response, or both. The frequency domain response provides identification of different types or generations of data storage disks or provides a secure keying mechanism for authorized access to proprietary software.

37 Claims, 7 Drawing Sheets

FREQUENCY BASED CARTRIDGE DETECTION SYSTEM

FIELD OF THE INVENTION

The present invention relates in general to a frequency based cartridge detection system. Particularly, the present invention relates to a detection system for identifying a disk for use in a disk drive. More particularly, the present invention has a source of irradiance for irradiating a marker, and a detector for detecting light emitted from the marker. Even more particularly, the present invention relates to detecting the presence of the correct disk in the disk drive by determining a frequency domain response of the light emitted from the marker. The frequency domain response may be either a phase response, an amplitude response, or both.

BACKGROUND OF THE INVENTION

Disk drives for receiving removable disk cartridges, including conventional 3.5 inch floppy disk drives, must have some mechanism for detecting the insertion or presence of a disk cartridge in the drive. The actuator that carries the recording heads of the disk drive across the recording surfaces of the disk should not be allowed to move unless the presence of an appropriate disk cartridge which is non-drive damaging is detected. The removability feature requires that the disk drive have a cartridge insertion opening into which foreign objects can be inserted. If these objects physically engage the drive as a legitimate cartridge would, then the heads could be loaded onto or into the foreign object, thereby destroying the drive. Also, the spindle motor of the disk drive will be activated by a falsely detected foreign object, thereby generating particle debris. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

"RETROREFLECTIVE MARKER FOR DATA STORAGE CARTRIDGE", U.S. Pat. No. 5,638,228, to Thomas, III, describes the reflection of a highly concentrated quasi circular lobe of light whose spread on reflection is captured by the aperture of a phototransistor in close proximity to a light-emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive. This patent is incorporated herein by reference.

Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICES PERFORMING DIVERSE FUNCTIONS", Ser. No. 08/746, 085, filed Nov. 6, 1996, Edwards, et al., describes such mini-cartridges, mini-drives, and hand-held devices. This application is incorporated herein by reference.

As disk storage products become smaller and smaller, the need for a cartridge marker of thinner physical size is required. In very thin disk drives where the distance between the cartridge marker and the optical sensing device is very small (e.g., 1 mm), the inherent reflective gain mechanism obtained with a retroreflector over a diffuse or specular reflector is lost. Holographic directional light control is possible, but due to the very small working distances the ability for false engagement of the drive is significantly increased with that approach.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

A "caddy" cartridge, as mentioned in the aforementioned Edwards, et al. application, provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading. This invention provides a solution of these problems also.

Another problem associated with the detection of LED light reflected from any reflective material is the occurrence of illuminance hot spots or structure in the LED output which often results in uneven illumination of the cartridge marker. Reflective cartridge markers can also become faded, scratched, or soiled. These factors combine to make the amplitude of the detected light signal highly variable.

Recently, in various industries such as the distribution industry, phosphors have been used in the control of goods by means of bar codes, and furthermore, bar codes are printed on various prepaid cards and passing cards, and these bar codes are read by optical reading apparatuses such as scanners to perform the desired actions. Moreover, various attempts have been made to apply forgery preventive means to credit cards and prepaid cards or to detect forged cards. For example, the marks such as bar codes are printed with an ink containing a phosphor by offset printing or by using an ink ribbon to form latent image marks. The latent image marks are irradiated with a semiconductor laser beam to excite the phosphor and the light emitted from the phosphor is received to read the bar code information by an optical reading apparatus. These techniques use the content or spectral shift from the irradiating light source for identification.

More recently, phosphors have been used in the disk drive industry for the identification and discrimination of disk and disk cartridges in disk data storage drives. "LATENT ILLUMINANCE DISCRIMINATION MARKER FOR DATA STORAGE CARTRIDGES", Ser. No. 09/161,007, filed Sep. 25, 1998, Thomas III, et al., describes a system for identifying and discriminating removable data storage cartridges and a data storage drive for receiving the cartridge. In addition, "LATENT IRRADIANCE DISCRIMINATION METHOD AND MARKER SYSTEM FOR CARTRIDGE-LESS DATA STORAGE DISKS", Ser. No. 09/160,811, filed on Sep. 25, 1998, Krieger et al., describes a phosphor marker for discriminating a cartridgeless type disk object that has been inserted into a disk drive. The systems of each of the above relate to the detection of the presence of the phosphor marker by measuring the time required for the radiated light from the marker to decay from one level to another level after the incident light from a light source is removed (e.g., the decay rate). Although the decay rate may provide the basis for discriminating an object that has been inserted into a disk drive, this approach provides an electronically complicated method of detecting the presence of the phosphor marker.

Although the art of detecting and discriminating between data storage cartridges is well developed, there remain some problems inherent in this technology, particularly in providing an electronically simple system that is accurate and inexpensive. Therefore, a need exists for a marker and detection system that produces reliable detection and discrimination between data storage cartridges under varying gain and marker spacings.

SUMMARY OF THE INVENTION

The present invention is directed to a data storage disk having a latent illuminance discrimination marker for determining whether the data storage disk is suitable for use in a disk drive. A light source illuminates the marker and the marker emits illuminance, preferably as phosphorescence. A detector detects the emitted illuminance, and a predetermined characteristic of the marker in the frequency domain is determined in order to validate the inserted disk. The frequency domain response may be either a phase response, an amplitude response, or both. The frequency domain response provides identification of different types or generations of data storage disks or provides a secure keying mechanism for authorized access to proprietary software.

According to one aspect of the present invention, the data storage drive has a source of irradiance at an irradiance wavelength and a detector of irradiance for determining whether a disk is suitable for use in a disk drive. The disk includes a body having a data storage medium and a marker on the body. The marker is adapted to receive irradiance from the source and emit irradiance toward the detector for detection of a frequency response of the emitted irradiance which thereby identifies the disk as being suitable for use in the drive.

In accordance with a further aspect of the present invention, the frequency response is a phase response. The phase response preferably includes a phase shift between the irradiated signal and the re-radiated signal. The phase shift is measured as a lag of the re-radiated signal from the irradiated signal. The marker is swept over frequency and the phase shift between the injected signal and the re-radiated signal is measured. The resulting phase response curve can be compared to an expected response to determine if the disk is valid.

In accordance with a further aspect of the present invention, the frequency domain response is an amplitude response. The amplitude response preferably includes a differential measurement in a peak amplitude of the irradiated signal and the re-radiated signal. The marker is swept over frequency and the amplitude of the re-radiated signal is measured. The resulting value is compared against an expected response to determine if the inserted disk is valid.

In accordance with a further aspect of the present invention, the frequency domain response is both a phase response and an amplitude response.

In a further embodiment within the scope of the present invention, a system is provided for determining whether the cartridge is suitable for use in the data storage drive. The system includes a data storage drive having a source of irradiance at an irradiance wavelength, a detector of irradiance, and a measurement mechanism for measuring a response characteristic of the emitted irradiance in the frequency domain which thereby identifies the cartridge as being suitable for use in the drive. The system further includes a disk for insertion into the data storage drive. The disk includes a body having a data storage medium, and a marker on the body. The marker receives irradiance from the source and emits irradiance toward the detector for detection one of a phase response, an amplitude response, or both of the emitted irradiance in the frequency domain which thereby identifies the cartridge as being suitable for use in the drive.

According to further aspects of the invention, the measurement mechanism preferably includes a phase shift oscillator. The marker can be used as the frequency-controlling element in the phase shift oscillator. The system also includes a feedback loop which oscillates in response to the present of a marker with a predetermined phase response. A second order high pass filter can be provided and the feedback system oscillates at a frequency where the combined phase shift presented by the amplifier, the marker, and the second order high pass filter reaches about 360 degrees.

According to further aspects of the invention, the measurement mechanism includes a swept frequency source. The marker is swept over the frequency source to excite the marker and the detector measures at least one of the phase response and the amplitude response. The swept frequency source can be a frequency controllable oscillator.

According to further aspects of the invention, the data storage drive includes a noise source which modulates a light source and irradiates the marker. The noise source is preferably white gaussian noise.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DESCRIPTION OF EXEMPLARY EMBODIMENTS AND BEST MODE

The present invention is directed to a latent illuminance marker (hereinafter also referred to as a tag) which is used to identify and discriminate the type of data storage cartridge (hereinafter also referred to as a disk cartridge) that has been inserted into a disk drive. The present invention provides an optical illumination mechanism which illuminates the marker. In response, the marker emits illuminance, preferably as phosphorescence. An optical detection mechanism is provided to ascertained a response characteristic of the marker in the frequency domain. The frequency domain response may be either a phase response, an amplitude response, or both. The frequency domain response provides identification of different types or generations of data storage disks or provides a secure keying mechanism for authorized access to proprietary software.

The marker system is a highly effective discriminant of appropriate cartridge insertion for a disk drive and can also be used to prevent unauthorized copies of software from being easily reproduced and used in disk drives. One means of effecting this software protection is to make the latent illuminance marker alone or in conjunction with data on the storage media a key mechanism which is inserted in the data storage drive for operation of the software. It should be noted that the term "illuminance" as used herein includes, but is not limited to, irradiance and the spectrum of light including ultra-violet (UV), visible, infrared, and near infrared.

A preferred embodiment of the present invention uses a phosphor marker that can be viewed in the frequency or s domain. Other materials having suitable frequency response characteristics can be used as the marker. Thus, the frequency or s domain response of the marker can be measured. This can be done by:

1. Sweeping the marker over frequency and measuring its amplitude response;
2. Sweeping the marker over frequency and measuring its phase response;
3. Sweeping the marker over frequency and measuring its amplitude and phase response;
4. Exciting the marker at a specific frequency and measuring the phase shift between the excitation signal and the response; and
5. Using the marker as the frequency-controlling element in an oscillator (which would rely on the frequency response or phase response of the marker). The frequency of oscillation is related back to the frequency domain representation.

Figure 1:
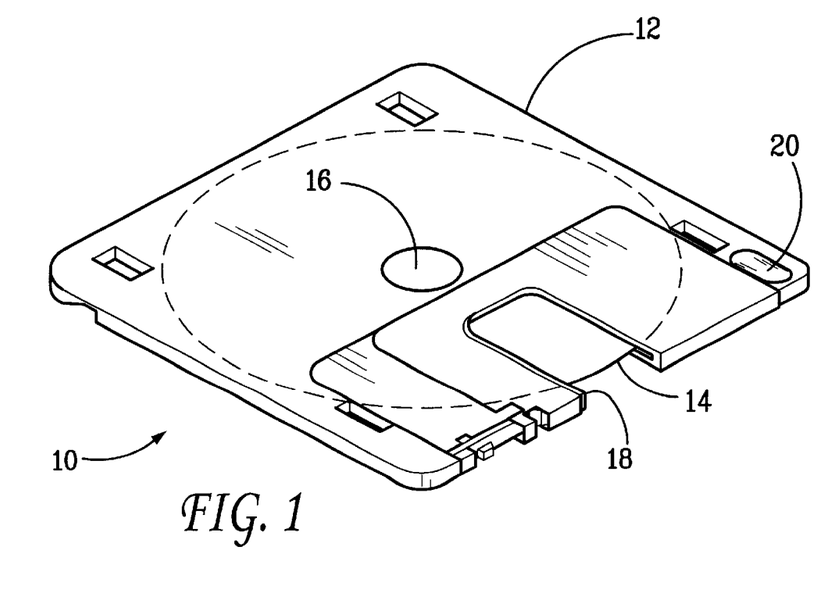
FIG. 1 shows an exemplary data storage cartridge of the present invention.
Figure 2:
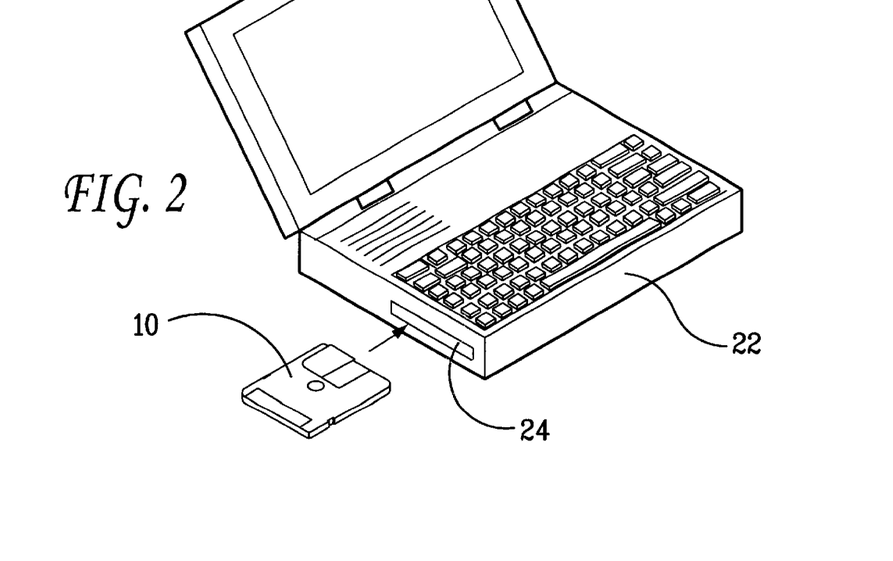
FIG. 2 is a perspective view of a device in which the invention is used.

FIGS. 1 and 2 show a disk cartridge 10 and a disk drive 24 to which the present invention is applicable. The cartridge and drive are described in the co-pending application entitled "INTERCHANGEABLE CARTRIDGE DATA STORAGE SYSTEM FOR DEVICES PERFORMING DIVERSE FUNCTIONS", Ser. No. 08/746,085, filed Nov. 6, 1996, which is incorporated herein by reference.

As shown in FIG. 1, the disk cartridge 10 includes an outer casing 12 and a disk-shaped recording medium 14 which is affixed to a hub 16 that is rotatably mounted in the casing 12. An opening on the bottom shell of the casing 12 provides access to the disk hub 16. A head access opening in the front peripheral edge 18 of the disk cartridge 10 provides access to the recording surfaces of the disk by the recording heads of a disk drive.

In accordance with the present invention, a latent illuminance marker, or tag, 20 is positioned on the disk cartridge 10 to be excited by an excitation source and detected by a detector in the disk drive 24 of FIG. 2.

FIG. 2 shows a laptop computer 22 which has a disk drive 24 for receiving the disk cartridge 10 of FIG. 1. The drive 24 may be the Iomega ZIP drive which is disclosed and claimed in the U.S. patents identified in U.S. Pat. No. 5,638,228, which is incorporated herein by reference.

The latent illuminance marker 20 on the cartridge 10 is desirably very thin in order for the cartridge 10 to fit in the thin form factor of the drive 24. Although any material exhibiting latent illuminant properties or characteristics can be used in accordance with the present invention, a phosphorescent material is used in a preferred embodiment of this invention. The latent illuminance material in accordance with the invention can comprise either a Stokes phosphor or an anti-Stokes phosphor.

A Stokes phosphor is a frequency down converter in which the material is excited with a shorter wavelength or higher frequency light which results in the emission of light of various wavelengths which are longer in wavelength and lower in frequency. An example of a Stokes phosphor is one which is excited with a light of about 660 nm and emits latent irradiance at between about 680 and about 800 nm. An anti-Stokes phosphor is a frequency up converter in which the material is excited with a longer wavelength or lower frequency light which results in the emission of light of various wavelengths which are shorter in wavelength and higher in frequency. Materials of this type are often used for the detection of infrared radiation.

A latent illuminance tag 20 that can be used with the present invention is preferably phosphorescent, and can be attached to a data storage cartridge 10 as a sticker, or printed or applied via suspension in an adhesive compound such as a UV curable epoxy onto a data storage cartridge 10. On each disk cartridge 10 having an authorized copy of the software, there is a tag 20 which is preferably coated with a phosphorescent photoluminent material which serves to identify the type or generation of disk cartridge 10 and distinguish it from other types of disk cartridges and purely passive light reflectors.

Figure 3:
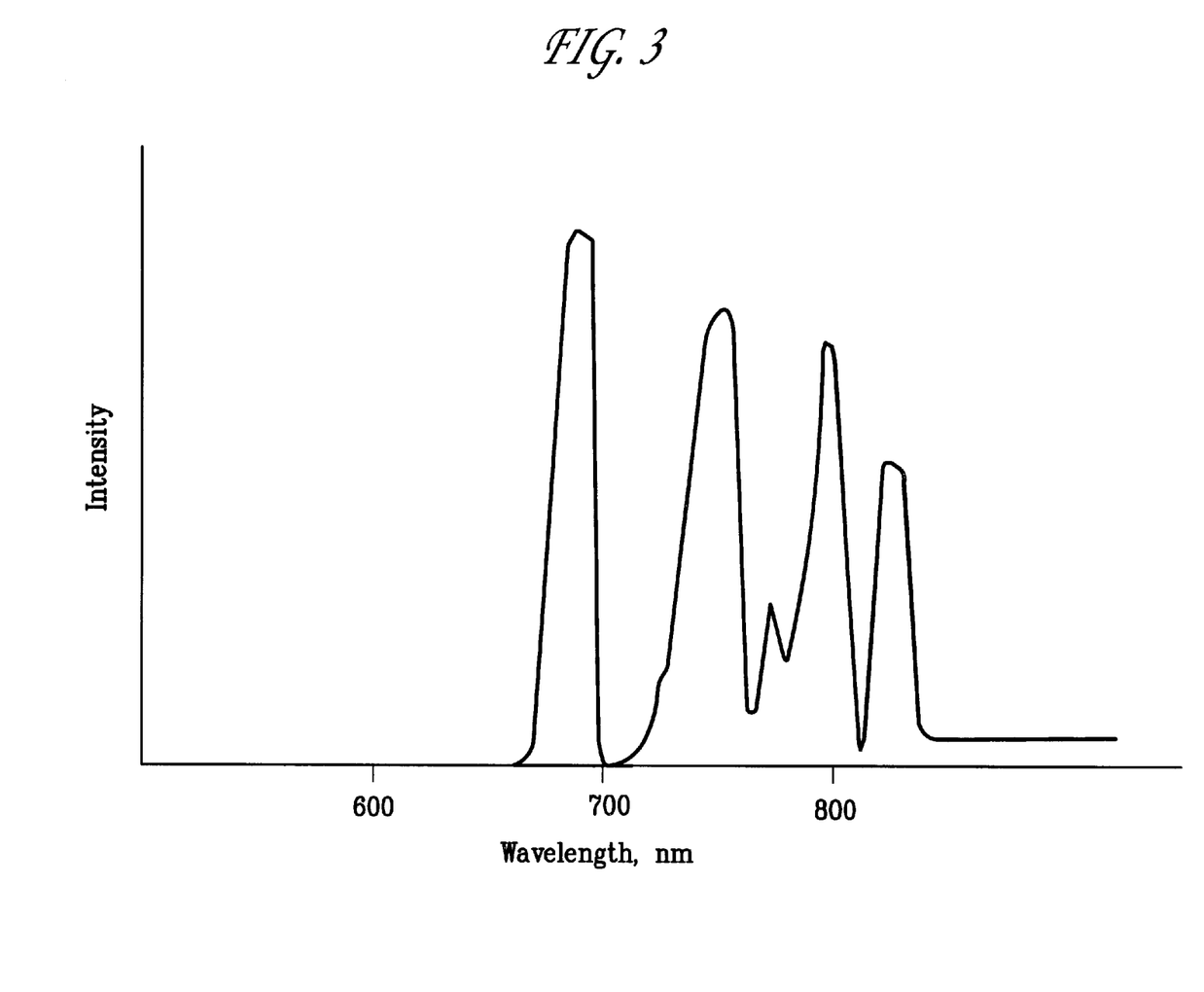
FIG. 3 is an exemplary latent illuminance output frequency domain response for a tag in accordance with the present invention.

The phosphor type materials used in the phosphorescent tag 20 fluoresce for a period of time after a light source, preferably an LED, that has illuminated the tag 20 is turned off. The LED strikes the tag at an excitation wavelength and the light emitted from the tag has a wavelength (or wavelengths) that is shifted from the excitation wavelength. The wavelength(s) can be shorter or longer than the excitation wavelength. As described above, the light emission from the tag 20 is called phosphorescence. An exemplary latent illuminance output frequency response for a tag in accordance with the present invention is shown in FIG. 3. The output spectrum is characteristic of the material that comprises the tag 20. The intensity of the illuminance (light) emitted is at least one of the wavelengths (e.g., about 680 nm) that can be monitored to measure a frequency domain response, as described below.

The present invention describes an alternate method of detecting phosphor tags with latent response characteristics. Phosphorescent tags are constructed such that when irradiated with light at a specific wavelength ($\lambda_i$) they become excited and re-radiate light over a band with nominal wavelength ($\lambda_r$) with a specific excitation function $e_{re}(t)$ and decay function $e_{rd}(t)$. The exact spectral characteristic of the re-radiated light is not a concern provided that a filter can be easily constructed that blocks the irradiated light and passes the majority of the re-radiated light. The nominal wavelength of the re-radiated light is preferably chosen such that it can be easily detected using inexpensive opto-electrical detectors such as phototransistors and photodiodes.

The excitation and decay function may be approximated by a single impulse response $h_r(t)$ which describes the energy released by the phosphor tag when irradiated by an extremely short pulse at a wavelength $\lambda_i$ with a single unit of energy. Stated differently, the amplitude of the re-radiated light, $e_r(t)$ can be described mathematically by the convolution of $h_r(t)$ with the incident light $e_i(t)$:

$$e_r(t)=e_i(t)*h_r(t)$$

Where the convolution in continuous time is defined by:

$$a(t)*b(t)=\int_{-\infty}^{+\infty} a(u) \cdot b(u-t)du$$

Using the Fourier or Laplace transform, the excitation of the phosphor tag may also be viewed in the frequency or s domain:

$$E_r(s)=E_i(s) \cdot H_R(s)$$

Where:

$$e_r(t) \leftrightarrow E_r(s)$$
$$e_i(t) \leftrightarrow E_i(s)$$
$$h_r(t) \leftrightarrow H_r(s)$$

The function $H_r(S)$ is called the transfer function of the phosphor tag. $E_r(s)$ represents the re-radiated light from the phosphor tag in the frequency or s domain. $E_i(s)$ represents the behavior of the light irradiating the phosphor tag expressed in the frequency or s domain.

Once a transfer function is defined for the phosphor tag, the phosphor tag, irradiating light source, optical filter, and detector can be viewed as an analog electrical filter. Any system that either measures the response of an electrical filter, or relies on the property of a filter in order to function can be redesigned to measure or use the response characteristics (not spectral characteristics) of the phosphor tag 20. This greatly increases the number of methods that can be used to detect the presence of a phosphor tag 20. These methods are less complex than previous systems that used a spectrum response, and are also more robust. In addition, these systems are more immune to error contribution.

Several preferred methods are presented below. The first approach uses the phosphor tag in a feedback system designed to oscillate if a phosphor tag with a known phase response is placed into the system. The next two approaches measure the amplitude and/or phase response of the phosphor tag over frequency. Another approach measures the frequency and phase response using a noise source.

The first approach includes detection of a phosphor tag using a phase shift oscillator. Preferably, the phosphor tag has a well defined first order low pass or high pass response of the form:

$$H_r(s) = K_r \frac{1}{1+s\tau_r} \quad \text{Or} \quad H_r(s) = K_r \frac{s\tau_r}{1+s\tau_r}$$

Figure 4:
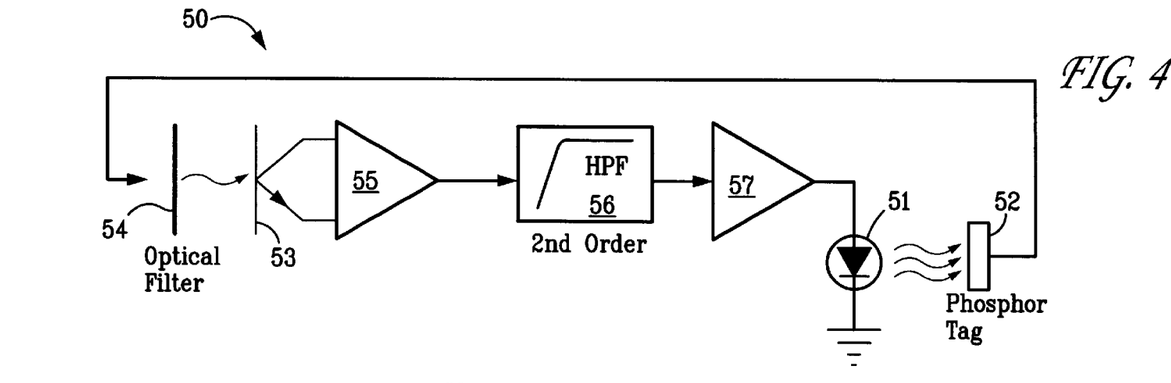
FIG. 4 shows an exemplary detection system of a phosphor tag using a phase shift oscillator.

As shown in FIG. 4, the phosphor tag 52 may be used as the frequency-controlling element in a phase shift oscillator. As shown, the system 50 includes a light source 51 that is optically coupled to a marker 52. A detector 53 of light, optionally having an optical filter 54, is opto-mechanically coupled to the marker 52. A first gain block amplifier 55 is electrically coupled to the detector device 53. A second order high pass filter (HPF) 56 is electrically coupled to the first gain block 55 and a second gain block 57 is electrically coupled to the second order HPF 56. Note that the system 50 as shown has one of the gain blocks being inverting (e.g., 180° phase shift). The system 50 oscillates at the frequency where the combined phase shift through the phosphor tag 52 and second order high pass filter 56 reaches about 180° and with the additional 180° added by the inverting amplifier, the total phase shift of the system 50 is 360°.

Note that an LED is shown as the light source 51 and a phototransistor as the detector 53. This is not a requirement for the design. A similar system could be developed using almost any light source 51 or detector 53 with reasonably fast response. The optical filter 54 is provided to keep reflected light from the light source 51 from being sensed by the detector 53, thereby saturating the detector 53 and swamping out the re-radiated light from the phosphor tag 52.

If the phosphor tag 52 has a second order response, a similar approach could be used based on a negative-resistance oscillator such as a Colpitts, Pierce or Hartley oscillator.

Figure 5:
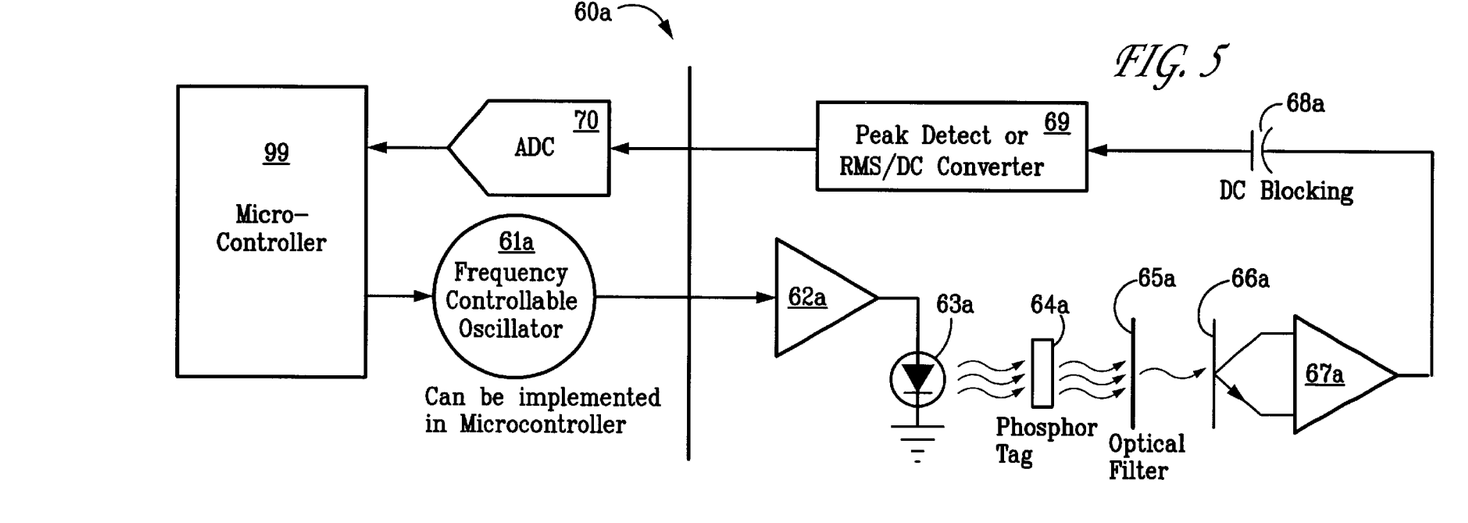
FIG. 5 shows an exemplary detection system of a phosphor tag using a sweep frequency source that measures the amplitude of the re-radiated signal over frequency.
Figure 6:
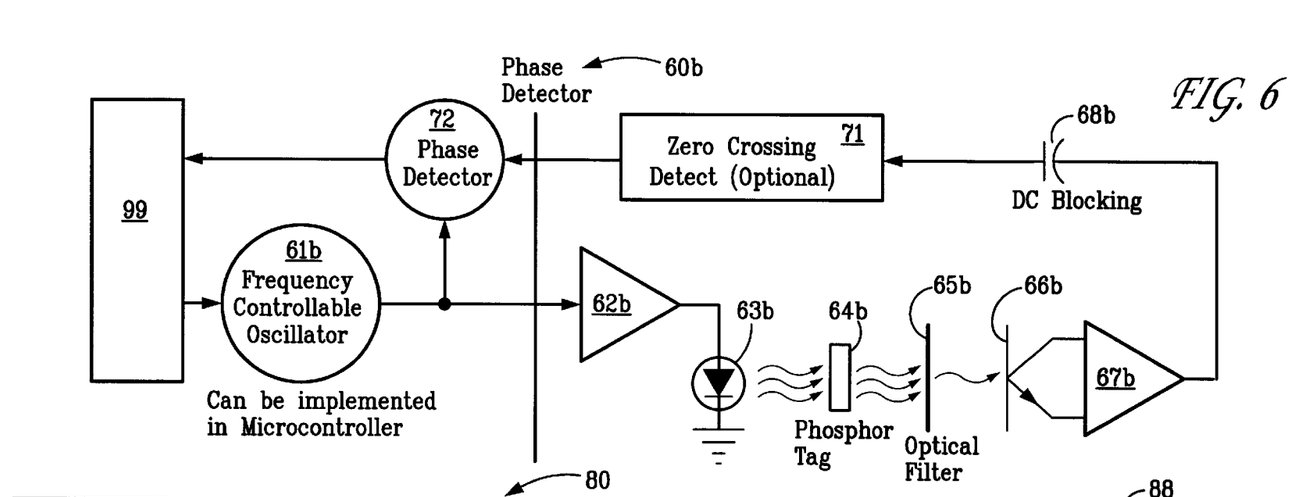
FIG. 6 shows an exemplary detection system of a phosphor tag using a sweep frequency source that measures a phase shift between the injected signal and the re-radiated signal.

A second approach described with respect to the systems shown in FIGS. 5 and 6 includes detection of a phosphor tag using a swept frequency source. This alternate system 60 of detecting the presence of a phosphor tag is to sweep the phosphor tag over frequency and measure its phase response, amplitude response, or both. Either approach may be advantageous if the response characteristics of the phosphor tag varies significantly or if the response characteristics are too complex to use in a resonant circuit, such as the phase shift oscillator.

FIGS. 5 and 6 illustrate different systems for measuring the response of the phosphor tags using the sweep frequency source. In each approach, a micro-controller 99 is used to control the measurement system.

The first system 60a, shown in FIG. 5, sweeps the phosphor tag over frequency and measures the amplitude of re-radiated signal over frequency. The resulting curve can be compared against an expected response in order to identify the presence of a valid disk. This system 60a includes a frequency controllable oscillator 61a which is electrically coupled to a first gain block 62a. Preferably, the frequency controllable oscillator 61a is implemented in the micro-controller 99. A light source 63a is electrically coupled to the first gain block 62a. The light source 63a is optically coupled to a marker 64a. The marker 64a is optically coupled to a detector device 66a, the detector preferably having an optical filter 65a. The detector 66a is electrically coupled to a second gain block 67a. A peak detect or RMS/DC converter 69 is electrically coupled to the second gain block 67a through a DC blocking device 68a. An ADC device 70 is electrically coupled to the peak detect or RMS/DC converter 69. Gain is added to the system to compensate for variations in amplitudes. The marker 64a acts as a first order low pass filter (similar to charging a capacitor and letting it decay). The system 60 uses the feedback from the marker 64a to maintain an oscillation.

The second system 60b, shown in FIG. 6, sweeps the phosphor tag over frequency and measures the phase shift between the injected signal and the re-radiated signal. The resulting phase response curve can be compared to an expected response in order to determine whether the inserted disk is valid. This system 60b includes a frequency controllable oscillator 61b which is electrically coupled to a first gain block 62b. Preferably, the frequency controllable oscillator 61b is implemented in the micro-controller 99. A light source 63b is electrically coupled to the first gain block 62b. The light source 63b is optically coupled to a marker 64b. The marker 64b is optically coupled to a detector device 66b, the detector preferably having an optical filter 65b. The detector 66b is electrically coupled to a second gain block 67b. A phase detector 72 is electrically coupled to both the output of the second gain block 67b and the output of the oscillator 61b. A DC blocking device 68b is connected between the second gain block 67b and the phase detector 72. A zero crossing detector 71 may be optionally electrically coupled to the second gain block through a DC blocking device 68b.

Figure 7:
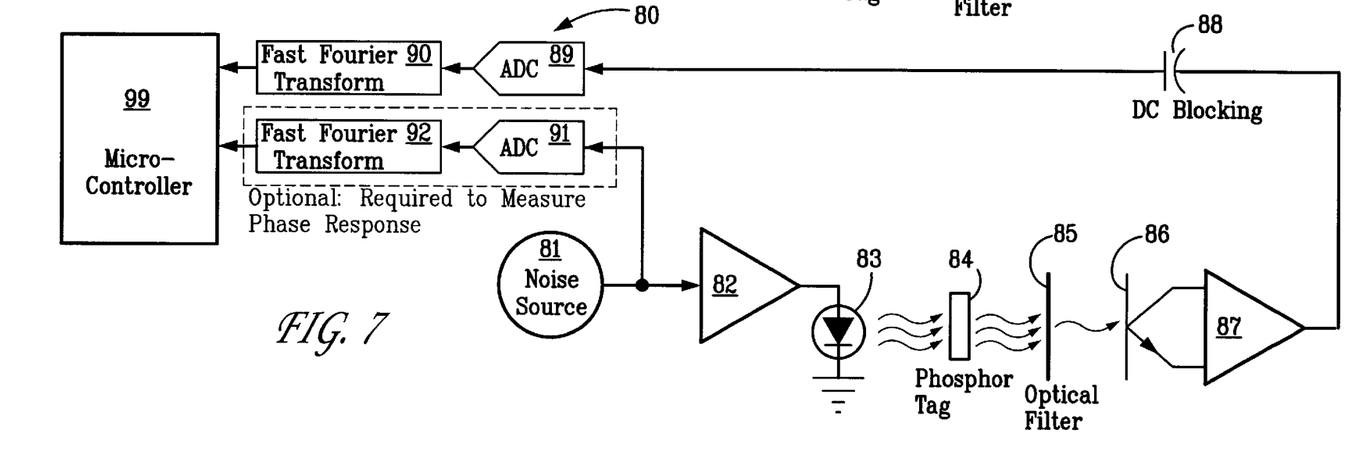
FIG. 7 shows an exemplary detection system of a phosphor tag using a noise source.

Still another approach described with respect to the system shown in FIG. 7, provides for the detection of a phosphor tag using a noise source. The frequency and phase response can also be measured using a noise source to excite the tag. The system 80 shown in FIG. 7 includes a noise source 81 that is coupled through a first gain block 82 to a light source 83. The light source is optically coupled to a marker 84 which in turn is optically coupled to a detector 86. Preferably, the detector 86 has an optical filter 85. A second gain block 87 is electrically coupled to the output from the detector 86. The second gain block 87 is electrically coupled through a DC blocking device 88 to an ADC device 89 and a Fast Fourier Transform 90 is performed on the measured response.

Alternatively, an additional ADC device 91 can be provided to the system 80 as shown in the dashed box of FIG. 7. The ADC device 91 is electrically coupled to the output of the noise source 81 and a Fast Fourier Transform 92 is performed on the input signal.

As shown in FIG. 7, the phosphor tag can be irradiated with light modulated with noise, such as white gaussian noise. Performing a Fast Fourier Transform (FFT) on the re-radiated signal (response signal) provides the frequency response of the tag. An amplitude response can be compared to an expected result in order to determine whether the inserted disk is valid for that drive. Alternatively, the phase response can also be determined by performing a second Fast Fourier Transform on the modulating noise (input signal), and then comparing the results of the two FFTs to validate the inserted disk.

Note that much of the above system can be implemented in a Digital Signal Processor (DSP) or even a microcontroller making this solution more attractive than a swept system in devices already having a DSP or micro-controller and A/D converters.

EXAMPLES

A first example describes an exemplary alternate system and method of detecting phosphor tags used to identify ZIP 250™ cartridges, manufactured by Iomega Corporation, Roy, Utah, with latent response characteristics.

The phosphor tags used on the ZIP 250 cartridges can be excited by visible red light at a nominal wavelength of about 630 nm (which is the peak nominal wavelength for phosphor tag. The actual light used is at 660 nm). Once excited, the phosphor tags respond by re-radiating near infrared over the band 720 nm to 1150 nm (e.g., the photo-detector has a peak response at around 825 nm). The response is measured using a phototransistor or photodiode with a visible light-blocking filter. The response characteristics are exponential in nature. If the visible light is turned on at time zero, the amplitude of the radiated light can be described by:

$$E_P = E_R \cdot K_{RP} \cdot (1 - e^{-t/\tau_p})$$

Wherein: $E_P$ represents the intensity of the re-radiated light; $E_R$ represents the intensity of the incident light radiated by the red LED; $K_{RP}$ represents the conversion efficiency of the phosphor tag; and $\tau_p$ represents the $e^{-1}$ time constant of the phosphor (nominally 250 $\mu$sec). In this example, the time constant is the time required for the re-radiated light to drop to about 36.8% of its original level when the visible red light is removed.

The decay characteristics are also exponential in nature. The re-radiated light decreases once the incident light from the red LED is removed. The decay characteristics of the phosphor tag can be described by:

$$E_P = E_R \cdot K_{RP} \cdot e^{-t/\tau_p}$$

Where the incident light from the red LED is removed at t=0.

Previous to this invention, the presence of the phosphor tag was detected by measuring the time required for the re-radiated light to decay from one level to another after the incident light from the visible red LED is removed.

The present invention discloses a new detection system and method that views the phosphor tag as a linear system with an impulse response. The impulse response of a system represents the response of a system to a pulse with a specific energy that lasts for a very small (substantially small) amount of time. This can be represented as follows:

$$h_P(t) = K_{RP} \cdot e^{-t/\tau_p}$$

Note that the current detection system in fact measures the response of the phosphor tag to a unit step function, which is an indirect means of measuring the impulse response of the phosphor tag:

$$E_P(t) = E_R(t) * h_P(t) = E_R \cdot [1 - u(t)] * h_P(t)^5$$

Wherein: $E_R(t)$ is a function describing the behavior of the red LED; $E_R$ is the amplitude of the incident red light on the phosphor tag; and the * is used here as the convolution operator. The convolution operator can be represented as:

$$a(t) * b(t) = \int_{-\infty}^{+\infty} a(u) \cdot b(u-t) du$$

Since the phosphor tag has an impulse response $h_P(t)$, a transfer function for the phosphor tag in the s domain may be determined. A transfer function of a system is the Fourier or Laplace transform of the impulse response of the system. The transfer function can be viewed as a frequency/phase domain representation of a system. By comparison, the impulse response is a time domain representation of a system. The transfer function for this phosphor tag in the S domain is represented by:

$$H_P(S) = L[h_p(t)] = K_{RP} \frac{1}{1 + \tau_p S}$$

The fact that the phosphor tag can be viewed in the frequency or s domain, indicates that the response of the phosphor tag may also be measured by measuring its frequency or s domain response. As discussed earlier, this response can be measured in one of several ways:

1. Sweep the phosphor tag over frequency and measure its amplitude response.
2. Sweep the phosphor tag over frequency and measure its phase response.
3. Sweeping the phosphor marker over frequency and measuring its amplitude and phase response;
4. Excite the phosphor tag at a specific frequency and measure the phase shift between the excitation signal and the response.
5. Use the phosphor tag as the frequency-controlling element in an oscillator (which would rely on the frequency response or phase response of the tag). The frequency of oscillation can be related back to the frequency domain representation of the tag and therefore its time constant.

All of the above approaches may provide for an electronically simpler method of detecting the presence of a phosphor tag.

Figure 8:
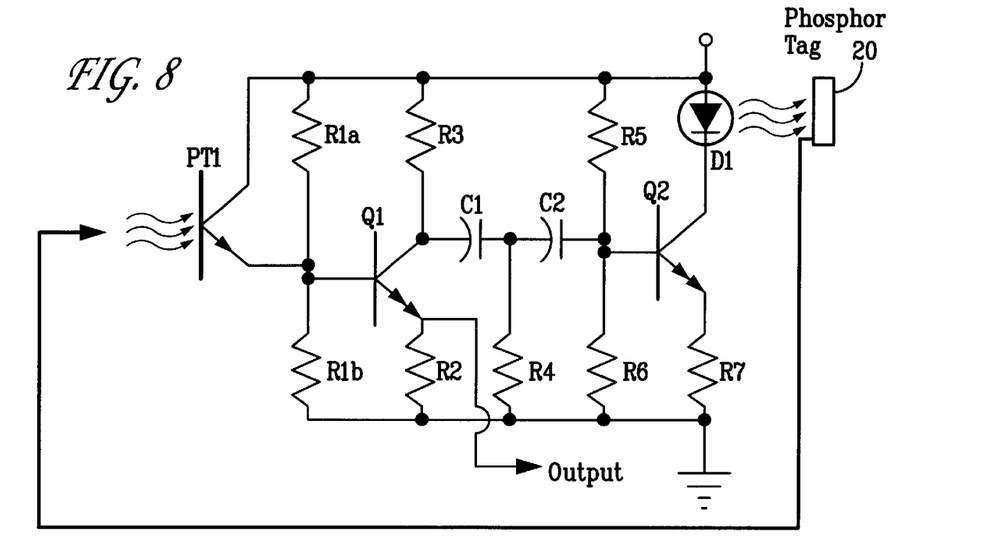
FIG. 8 shows an alternative detection system using a phase shift oscillator.
Figure 9:
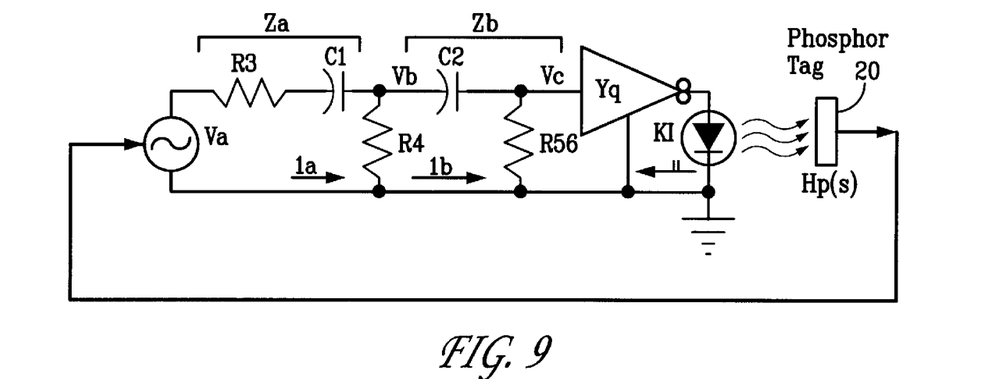
FIG. 9 shows the system of FIG. 8 redrawn for AC analysis.

A second example was constructed to analyze the performance of the detector system on a ZIP 250™ cartridge detection circuit as shown in FIGS. 8 and 9 using a phase shift oscillator. As shown in FIG. 8, an additional gain stage has been added using Q1 to increase the effective gain through the loop filter network and back to the marker and detector. This was done because analysis has shown that the gain provided by previous circuits were inadequate.

As shown in FIG. 8, resistors $R_{1a}$, $R_{1b}$, $R_2$, and $R_3$ set the voltage gain of the phototransistor as well as the bias point. Ideally, the DC voltage at the emitter of $Q_1$ is positioned half way between the supply rail and ground. This provides maximum swing in both directions and therefore maximum amplitude. This point is preferably tied to a process port pin with minimal leakage to monitor the oscillator.

Resistor $R_3$ sets the output impedance of the gain stage formed by $Q_1$ and can be viewed as part of the first first-order high pass network formed by $R_3$, $C_1$ and $R_4$. Note that a second first-order high pass network is formed by $R_4$, $C_2$, $R_5$, and $R_6$.

Transistor $Q_2$ along with resistor $R_7$ sets the gain of the gain stage used to drive LED $D_1$. The gain is primarily limited by the $h_{fe}$ of $Q_2$. Note that pulling the emitter of $Q_2$ below 1.2 volts shuts down the oscillator. This can easily be accomplished using a single diode (or alternatively by tying $R_5$ to a port).

For AC analysis, the above system can be redrawn as shown in FIG. 9. As shown in FIG. 9, $R_{56}$ is the parallel combination of $R_5$ and $R_6$, gain $Y_Q$ formed by $Q_2$ and $R_7$, expressed in siemens (mhos). The voltage $V_A$ is the voltage across the parallel combination of $R_1$ and $R_2$.

The transfer gain of the LED can be defined as $K_L$, with units lumens/amp. The transfer gain of the phototransistor can be defined as $K_{RP}$, with units amp/lumens. The transfer function of the phosphor tag can be defined as a first order low-pass section with transfer function:

$$H_p(s) = K_{RP} \frac{1}{1 + \tau_p s}$$

Note that $K_{RP}$ is the DC gain of the transfer function, $\tau_p$ is the $e^{-1}$ time constant of the phosphor tag. Lets also define the gain of $Q_1$, $R_{1a}$, $R_{1b}$, $R_2$ and $R_3$ by $Z_{Q1}$. Based on the above relationship, $V_F$ can be related to $I_L$ by the transfer function:

$$H_{AL}(s) = \frac{V_A(s)}{I_L(s)} = -Z_{Q1} K_L K_{RP} K_F \frac{1}{1 + \tau_p s} = Z_{AL} \frac{1}{1 + \tau_p s}$$

Note that $Z_{AL}$ has been defined as the total DC gain in-to-out of the LED-phosphor-phototransistor system:

$$Z_{AL} = -Z_{Q1} K_L K_{RP} K_F$$

This provides an expression to close the loop in the system. Note that $Z_{AL}$ can be measured. Measuring $K_L$, $K_{RP}$, or $K_F$ is in fact much more difficult. Also note that $Z_{AL}$ is negative. This represents the 180° of phase shift from the LED through the photo-transistor.

Preferably, the system design and setting provide a system that will oscillate when a phosphor tag is present, but will not oscillate with most foreign objects.

Any material or combination of materials exhibiting a response characteristic in the frequency domain can be used as the marker material. Preferably the marker material is a material having a memory or latent illuminance properties or characteristics, including any phosphor or combination or blend of phosphors. Preferred phosphors include rare-earth phosphors including oxides, oxysulfides, silicates, and alumites as well as other photoluminent materials and compounds. There are many combinational possibilities for photoluminent materials. Most preferably, a phosphor tag for use in accordance with the present invention is manufactured by Sarnoff Corporation, Princeton, N.J. Although the present invention is described with reference to the preferred phosphor marker, the invention contemplates the use of any material having a response characteristic in the frequency domain, and it is not intended to limit the scope of the invention.

For example, the tag can include a screen printed on a plastic plug. The desired phosphorescent material or compound can be suspended in an optically clear binder which is coated/printed on the plug substrate. Alternatively, the tag can include a pressure sensitive adhesive (PSA) sticker having phosphorescent material or compound suspended in an optically clear binder which is coated/printed on the sticker substrate (e.g., white vinyl). PSA with a protective liner can be applied to the back side of the sticker substrate.

The compound can alternatively be used as a plastic filler for injection molded parts/tags or blended with inks for printing, or applied via suspension in an adhesive compound such as UV curable epoxy, or using any other suitable method. Parts requiring identification and discrimination can be either molded, printed onto, or tagged with a phosphorescent material or compound.

It is desirable that with ordinary handling and abrasion the tag will not flake, peel or otherwise be damaged in a manner to adversely affect its performance or generate debris which could adversely affect a disk drive's performance. Moreover, preferably, the tags are operational from about −20 to about 65° C. (about −4 to about 149° F.) and have a functional life of at least 15 years. Thus, inorganic phosphors are preferred as the phosphorescent material.

The latent illuminance emitted from the tag is sensed by a photodetector to provide the tag type discrimination and desirably has as high a conversion efficiency as possible. In other words, the latent illuminance should have as high a latent irradiance conversion efficiency (LICE) as possible. LICE is the percentage of excitation light hitting the tag that is converted to latent illuminance/light. Moreover, the latent illuminance is preferably irradiated from the tag in a diffuse, spherical manner, equal in all directions.

Figure 10A:
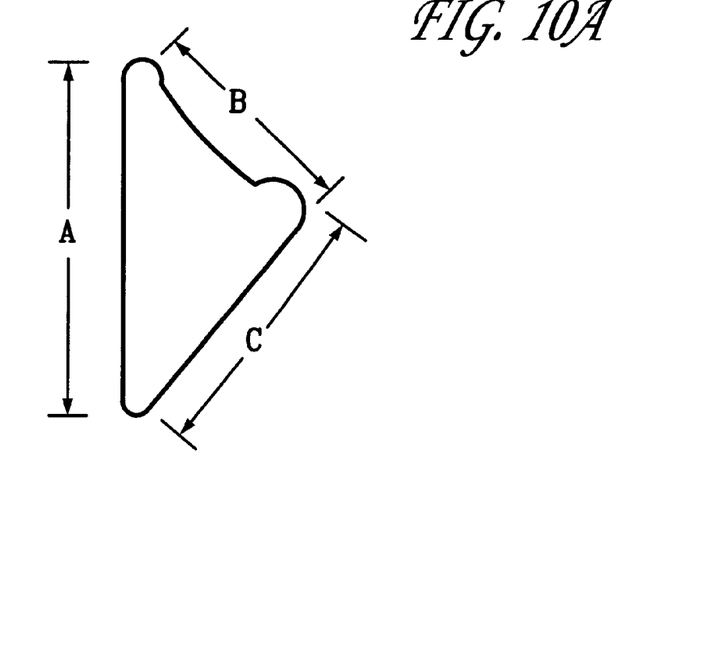
FIGS. 10A and 10B show a plan view and an exploded perspective view, respectively, of one embodiment of a phosphor tag for use with the present invention.
Figure 10B:
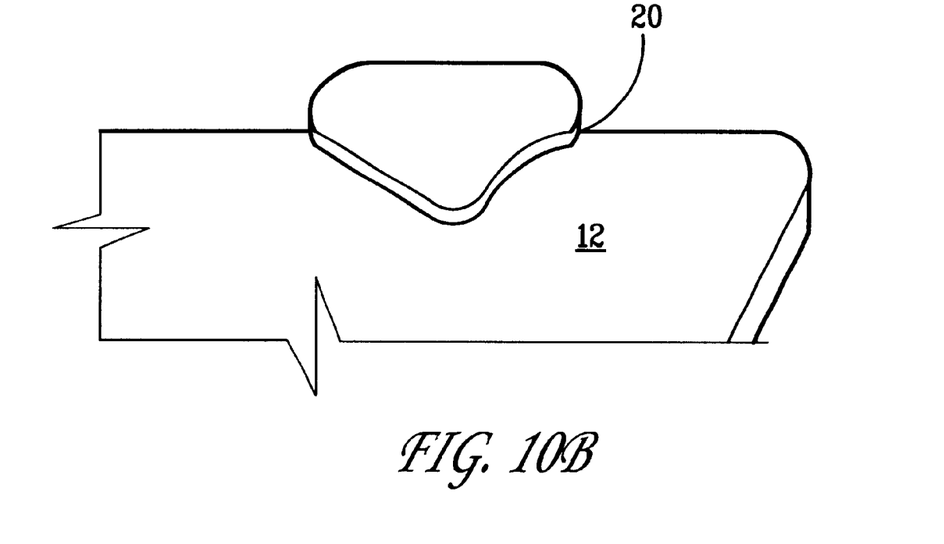

The tag can be any size or shape that fits on the disk cartridge, with the thickness, or ink thickness if printed, preferably less than about 0.5 mm and a thickness tolerance of about ±0.05 mm. FIG. 10A shows exemplary physical dimensions of the tag implementation for a cartridge application, with dimensions: A equals approximately 1.2 cm, B equals approximately 0.9 cm, and C equals approximately 1.0 cm. The sheet tolerance for the tag illustrated in FIG. 10A is about ±0.13 mm. FIG. 10B shows an exploded perspective view of the tag 20 on the outer casing 12 of the disk cartridge.

Figure 11:
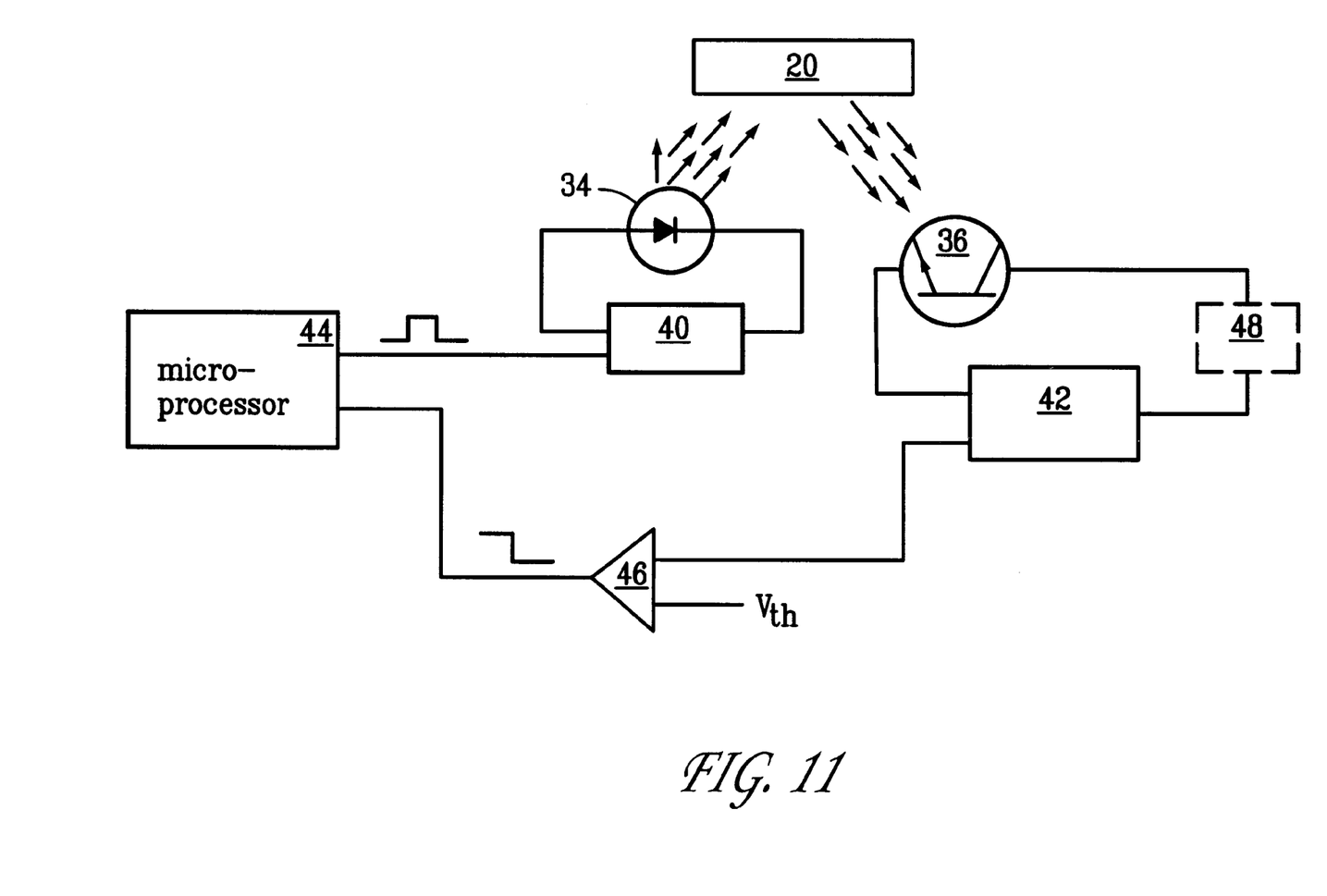
FIG. 11 shows a block diagram of an exemplary system in accordance with the present invention.

In a preferred embodiment, the disk drive has an emitter/detector pair that is used for interrogation of the latent illuminance tag. FIG. 11 shows a simplified block diagram of an exemplary system in accordance with the present invention. A light source 34, preferably an LED, illuminates a latent illuminance tag 20 and is then turned off. The LED 34 is driven by LED switching and current limiting electronics 40, and a microprocessor 44 which sends pulse commands to the electronics 40. The tag 20 emits illuminance, having a specific response characteristic in the frequency domain, which is detected by a detector 36, preferably a phototransistor or photodiode. Preferably, the detector 36 waits a predetermined time, such as about 10 $\mu$sec, after the LED is turned off before beginning measurement of the latent illuminance at the particular wavelength (s) from the tag. Gain, preferably 100×, is applied to the output of the phototransistor or photodiode 36 by a gain stage 42. The output of the gain stage 42 is provided to a comparator 46 which compares the emitted illuminance with a threshold Vth. The results of the comparison are provided to the microprocessor 44 which measures the timing, determines the frequency domain response, and identifies the disk cartridge for validation, as described above. Element 48 contains optional filters that are described below with respect to further embodiments.

More particularly, when a data storage cartridge is inserted into a disk drive, the light source 34, preferably an LED, emits a short intense pulse of light. The light can be one pulse or a continuous cycle of pulses. Moreover, in another exemplary embodiment, the detection circuitry optically pumps the phosphorescent tag with the light source and measures and compares a phase response, an amplitude response, or both, between the drive signal and the frequency response illuminance. This provides a measure of the frequency domain response.

LEDs are capable of handling large current surges for short periods to generate bright flashes of light. The emitted LED light illuminates the latent illuminance tag 20 and thereby excites atoms or ions which emit light as they decay to lower energy levels. The phosphor type materials used in the preferred latent illuminance tag 20 fluoresce for a period of time as the LED 34 is pulsed. The photonic sensor 36 is in close proximity to the LED 34. This sensor 36 is initially saturated by the emitted light from the tag 20. As the LED 34 is pulsed, the disk drive microprocessor 44, or a functionally similar system, monitors the gain and phase shift around the closed loop and, in an exemplary embodiment, determines a response characteristic in the frequency domain required for the latent illuminance or phosphorescence. The frequency domain response is controlled by the gain and phase shift and can be measured by the drive microprocessor 44 provides information by which the drive can determine which generation or type of cartridge has been inserted. Any light source can be used that puts out light sufficient to energize the latent illuminance tag or marker and can be quickly turned on/off.

Low cost physically compact commercially available packages which include both an LED irradiance source and a phototransistor or photodiode (photonic sensor) such as the Sharp GP2S27 Photointerrupter or the Siemens SFH9101 Light Reflection Switch can be used as excitation/detection apparatus for the present invention. The LED wavelength and window optical potting (spectral filter characteristics) of these devices can be customized for use with the embodiments of the present invention.

In an exemplary embodiment, a flood LED (FLED) is the preferred light source for charging the tag. A preferred commercially available FLED is part number SML-LX1209SR36984 manufactured by Lumex. Alternatively the FLED can be product number TLRA1005 manufactured by Toshiba which is a bright 660 nm light source. The FLED is high power and has the ability to charge the latent illuminance tag beyond what could be done with an ordinary LED, such as one found in a commercially available photointerrupter. The FLED prevents the problem of the low signal response from the latent illuminance material and high noise content in the detection circuit.

Preferably, the FLED has a very narrow emission band matching the absorption band of the latent illuminance/irradiance tag.

The FLED also has a narrow beam divergence. This narrowly diverging beam significantly reduces the amount of reflected light from the platform elements on which a cartridge is disposed in a disk drive. The LED source in the photointerrupter is a widely diverging light source. The FLED is a very intense light source. It is configured to send out between about 500 and about 1000 mcd of light to a small area on the tag. The LED source in the photointerrupter is on the order of about 10 to about 15 mcd and spreads light over a much larger area.

Thus, in detection of a latent illuminance tag, a narrow well matched frequency band emission is desirable to the function of the latent illuminance material and system circuitry.

The frequency domain response for different generations of cartridges can be produced by using different material compounds which inherently have different latent illuminance frequency domain responses due to their photoreactive chemistry. An appropriate amount is a large enough increase in the frequency response such that the system tolerances can be allowed for in the system and do not cause overlap in the frequency domain response discrimination windows for various cartridge generations. Preferably, the system is dependent on the frequency domain response of the latent illuminance material.

A series of phosphorescent compounds is used which produces a latent illuminance after being illuminated by an LED source having a visible to near-IR wavelength. This family of compounds preferably has a different frequency domain response for the latent illuminance for each of the members of the family. The difference in the frequency responses is used as a discriminator between a particular member of the family and others and between the particular member and other purely passive light reflectors.

The present invention can be used to identify read only disks, write once disks, and disks having particular applications, such as photodisks for digital camera applications, global positioning or map disks, and book disks.

Although the present invention has been described herein with respect to cartridge detection, it can be used in any object detection or discrimination apparatus or application, such as anti-counterfeiting apparatus and applications. Also, the invention contemplates that the invention is applicable to cartridgeless type data storage mediums, such an optical disks and the like.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A disk for a data storage drive which has a source of irradiance at an irradiance wavelength and a detector of irradiance for determining whether said disk is suitable for use in a disk drive, said disk comprising:
    a body;
    a data storage medium in said body; and
    a marker comprising a latent illuminance material on said body, said marker being adapted to receive irradiance from said source and emit irradiance toward said detector for detection of a frequency response of an emitted irradiance which thereby identifies said disk as being suitable for use in said drive.

2. The disk of claim 1 wherein said frequency response is a phase response.

3. The disk of claim 2 wherein said phase response comprises a phase shift between said irradiated signal and said re-radiated signal.

4. The disk of claim 2 wherein said phase response comprises a measurement in a lag of said re-radiated signal from said irradiated signal.

5. The disk of claim 1 wherein said frequency response is an amplitude response.

6. The disk of claim 5 wherein said amplitude response comprises a differential measurement in a peak amplitude of said irradiated signal and said re-radiated signal.

7. The disk of claim 1 wherein said frequency response is both a phase response and an amplitude response.

8. The disk of claim 1, wherein said marker has a latent illuminance wavelength spectrum in a range between about 450 nm and about 1050 nm.

9. The disk of claim 8, wherein said marker has a latent illuminance wavelength spectrum in a range between about 680 nm and about 800 nm.

10. The disk of claim 8, wherein said irradiance wavelength is outside of said latent illuminance wavelength spectrum.

11. The disk of claim 1, wherein said latent illuminance material comprises a phosphorescent material.

12. The disk of claim 11, wherein said phosphorescent material comprises a rare earth phosphor.

13. A system for determining whether said cartridge is suitable for use in said data storage drive, comprising:
    a data storage drive comprising:
        a source of irradiance at an irradiance wavelength;
        a detector of irradiance; and
        a measurement mechanism for measuring a response characteristic of an emitted irradiance in a frequency domain which thereby identifies said cartridge as being suitable for use in said drive;
    a disk for insertion into said data storage drive, said disk comprising:
        a body;
        a data storage medium in said body;
        a marker comprising a latent illuminance material on said body, said marker receives irradiance from said source and emits irradiance toward said detector for detection one of a phase response, an amplitude response, or both of an emitted irradiance in a frequency domain which thereby identifies said cartridge as being suitable for use in said drive.

14. The system of claim 13, wherein said measurement mechanism further comprises a phase shift oscillator, wherein said marker is used as a frequency-controlling element in said phase shift oscillator.

15. The system of claim 14 further comprising a feedback system, wherein said feedback system oscillates in response to the presence of a marker with a predetermined phase response.

16. The system of claim 15, further comprising a second order high pass filter and an amplifier, wherein said feedback system oscillates at a frequency where a combined phase shift through said marker, said second order high pass filter and said amplifier reaches about 360 degrees.

17. The system of claim 13, wherein said marker has a second order response, and a phase shift is determined using one of a Colpitts, a Pierce, and Hartley oscillator.

18. The system of claim 13, wherein said measurement mechanism further comprises a swept frequency source, wherein said marker is swept over said frequency source to excite said marker and said detector measures at least one of said phase response and said amplitude response.

19. The system of claim 18, wherein said swept frequency source is a frequency controllable oscillator.

20. The system of claim 19 wherein said measurement mechanism further comprises an ADC device which receives an electrical signal from said detector output.

21. The system of claim 20 wherein said swept frequency source and said ADC device are implemented in a microcontroller.

22. The system of claim 13 wherein said data storage drive further comprises a noise source, wherein said marker is irradiated with light modulated with said noise source.

23. The system of claim 22 wherein said noise source is white gaussian noise.

24. The system of claim 22 wherein said noise source is implemented in one of a digital signal processor (DSP) and a micro-processor.

25. A feedback system for the detection and verification of a correct cartridge for use in a disk drive comprising:
    a disk drive having:
        a source of irradiance at an irradiance wavelength;
        a detector of irradiance for determining whether said cartridge is suitable for use in a disk drive;
        a feedback loop;
        an oscillator;
    a cartridge having:
        a body;
        a data storage medium in said body; and
        a marker on said body, said marker being a latent illuminance material which receives irradiance from said source and emits irradiance toward said detector for detection of a predetermined response characteristic of an emitted irradiance in a frequency domain which thereby identifies said cartridge as being suitable for use in said drive.

26. The system of claim 25 wherein said source of irradiance comprises a light source.

27. The system of claim 26 wherein said light source is an LED.

28. The system of claim 25 wherein said detector of irradiance comprises one of a photo-electrical detector, a photodetector, a phototransistor, and a photodiode.

29. The system of claim 25 wherein said oscillator comprises a phase shift oscillator.

30. The system of claim 25 wherein said feedback loop further comprises:
   an amplifier (first gain) coupled to an output of said oscillator;
   a second order high pass filter coupled to an output of said amplifier;
   an output stage (second gain) coupled to an output of said second order high pass filter; and
   wherein said feedback loop is opto-mechanically connected between said marker and said detector.

31. The system of claim 30 wherein said amplifier adds gain to said re-radiated signal to compensate for variations in amplitude.

32. The system of claim 25 wherein said feedback from said marker is used to maintain an oscillation.

33. The system of claim 32 wherein said oscillation is a function of a phase shift of said signal as it passes through said marker.

34. The system of claim 25 wherein said feedback loop has about 360 degrees of phase shift around said feedback loop.

35. The system of claim 34 wherein said about 360 degrees of phase shift around said feedback loop comprises about 180 degrees of phase shift in said phosphorous marker and about 180 degrees of phase shift in one of a first gain and a second gain.

36. The system of claim 35 wherein one of said first gain and said second gain is inverted.

37. The system of claim 25 wherein said oscillator is a negative-resistance oscillator.

* * * * *